US005229744A

United States Patent [19]

Ogura

[11] Patent Number: 5,229,744

[45] Date of Patent: Jul. 20, 1993

[54] PIEZOELECTRIC TYPE PAGER

[75] Inventor: Kohji Ogura, Nagoya, Japan

[73] Assignee: NGK Spark Plug Co., Ltd., Japan

[21] Appl. No.: 796,844

[22] Filed: Nov. 25, 1991

[30] Foreign Application Priority Data

Nov. 27, 1990 [JP] Japan ................................ 2-327584
Nov. 30, 1990 [JP] Japan ................................ 2-337793

[51] Int. Cl.$^5$ ................................ H04Q 1/30

[52] U.S. Cl. ................................ 340/311.1; 340/407; 340/825.44; 340/825.46; 310/324

[58] Field of Search ................ 340/407, 311.1, 825.44, 340/825.46; 310/330, 331, 332, 324

[56] References Cited

U.S. PATENT DOCUMENTS 4,352,961 10/1982 Kumada et al. .................... 310/324
4,685,767 8/1987 Ueshiba et al. .................... 310/324
4,969,197 11/1990 Takaya ................................ 310/324
5,053,671 10/1991 Kobayashi et al. ................ 310/324

FOREIGN PATENT DOCUMENTS 55-26755 2/1980 Japan .
2-67023 3/1990 Japan .
2-134931 5/1990 Japan .

*Primary Examiner*—Jin F. Ng
*Assistant Examiner*—Edward Lefkowitz
*Attorney, Agent, or Firm*—Larson and Taylor

[57] ABSTRACT

A piezoelectric type pager comprises at least one piezoelectric vibrator which has one end fixed on a portion of a casing and the other end fixed on another portion of the casing and can generate a vibration which has a frequency suitable to attract a user's attention without causing any trouble for those around one carrying the pager.

5 Claims, 4 Drawing Sheets

PIEZOELECTRIC TYPE PAGER

BACKGROUND OF THE INVENTION

The present invention relates to a piezoelectric type pager using a flexible piezoelectric vibrator such as a piezoelectric bimorph element.

Generally, paging device of this kind may be used for informing a user a calling, in which a match between an address code and a user's code is detected and an acoustic or vibration signal is generated in response to the detection of the match.

As will be known in the art there have been proposed portable paging devices in which an electronic buzzer is used as a signalling means for informing a user a calling. Such prior art paging devices are disclosed in Japanese Patent Kokai Nos. 2-67023 and 2-134931.

There have been also proposed vibration type pagers which are intended to generate a vibration signal by means of a miniature motor and transmit any information to a user who is carrying the pager. One such prior art pager is disclosed in Japanese Patent Kokai No. 55-26755.

However, the prior art pagers using the electronic buzzer have a drawback that not only a person who is carrying such pager but also other persons are annunciated, whereby causing trouble for those around one.

The prior art pagers having a miniature motor have drawbacks that IC circuit of an associated driver control may be erroneously operated due to sliding noises of brush contacts in the motor, and that moving parts are inherently likely to occasional breakdown. Another drawback or problem with such motor driven pagers is that a significantly large electric energy is required for operating the device, that is they do not have low enough power consumption to avoid frequent battery replacement or recharging.

Recently, there has been proposed a pager having a piezoelectric vibrating element in which as will seen in FIG. 1 an elongated vibrating casing Y has a holding axis L extending across the width of the casing near one end thereof, the other end or vibrating end E is vibrated.

It is required that such a piezoelectric vibrating element generates a vibration having a lower frequency of approximately 100 Hz because a higher frequency leads to a noisy acoustic vibration such as a sound wave.

Resonance frequency f of the vibration to be generated is defined by following equation;

$$f=\frac{1}{2}\pi-\sqrt{k}/\sqrt{m}$$

where m is a mass of a vibrator and k is a spring stiffness.

It is, therefore, appreciated that the resonance frequency f may be adjusted by selecting the mass m of the vibrator, and the mass m should be selected as large as possible to obtain a suitable frequency as mentioned above.

In order to satisfy such requirement, with the conventional piezoelectric vibrator it is necessary to provide one or more additional weights on the vibrating portion of the vibrator for adjusting the mass m thereof. However, this leads to weighty device.

Further, the prior art pager using such piezoelectric vibrator has a drawback that relatively high operation voltage is required because the distance between the holding axis L and the vibrating end E is relatively long so that the amplitude of the vibration becomes large to have a large impedance.

SUMMARY OF THE INVENTION

It is therefore an object of the present invention to overcome said disadvantages in the prior art, and to provide a piezoelectric type pager which is capable of informing efficiently a user a calling without causing trouble for those around one.

Another object of the present invention is to provide a piezoelectric type pager which is of simple construction and has low power consumption enough to avoid frequent battery replacement or recharging.

According to one aspect of the present invention, there is provided a piezoelectric pager comprising at least one flexible piezoelectric vibrator, a driver circuit unit for actuating said each piezoelectric vibrator, a battery for energizing said piezoelectric vibrator and said driver circuit unit, a casing separated into a first and second casing portions for containing said piezoelectric vibrator, the one end of said each piezoelectric vibrator being fixed on said first casing portion and the other end of said each piezoelectric vibrator being fixed on said second casing portion, whereby said first and second casing portions are assembled with a small spacing therebetween.

The first casing portion of the casing may be intended to contain the driver circuit unit, and the second casing portion may be intended to contain the battery.

Each piezoelectric vibrator element may comprise a leaf spring member and piezoelectric elements fixed on an upper and bottom surfaces thereof.

Two piezoelectric vibrators may be juxtaposingly arranged between the first and second casing portions, in which one end of each piezoelectric vibrator is fixed on the first casing portion and the other end of each piezoelectric vibrator is fixed on the second casing portion.

When the driver circuit receives an associated address code or calling signal, the driver circuit unit is operated so that each piezoelectric vibrator is supplied with a voltage from the battery and thus is excited. Then, the excitation or vibration of each vibrator causes the first and second casing portions fixed on the both ends thereof to vibrate in upper and lower directions around the small spacing. The vibrations of the first and second casing portions may be directly transmitted to the user who is carrying the device.

The first and second casing portions have functions as weights for each vibrator to reduce a resonance frequency of the vibration thereof.

In case the driver circuit unit and the battery are contained in the first and second casing portions, respectively, it is possible to more reduce the resonance frequency because the weights of the driver circuit unit and the battery are added to the first and second casing portions.

According to a second aspect of the present invention there is provided a piezoelectric pager comprising a vibrating casing, at least one vibrator having two flexible piezoelectric vibrating elements each of which has one end provided with a weight and other end fixed in the said casing at a longitudinal central axis thereof, said two flexible piezoelectric vibrating elements being arranged symmetrically on the both sides of longitudinal central axis of said casing, and a control circuit unit contained in said casing for exciting said each vibrator so that said two flexible piezoelectric vibrating elements in said each vibrator are vibrated in opposite directions to each other.

The present invention will now be described by way of example with reference to the accompanying drawings:

DETAILED DESCRIPTION

Figure 1:
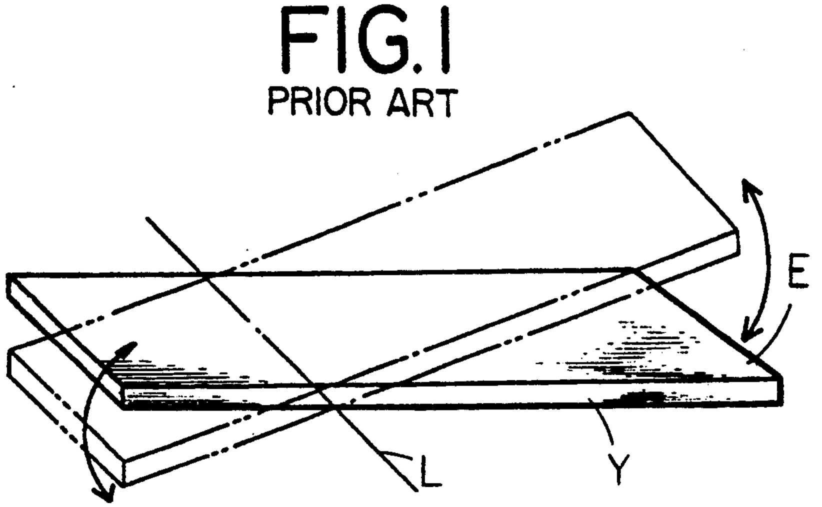
FIG. 1 PRIOR ART
FIG. 1 is a perspective view schematically showing a principle of a prior art using a piezoelectric vibrating element.
Figure 2:
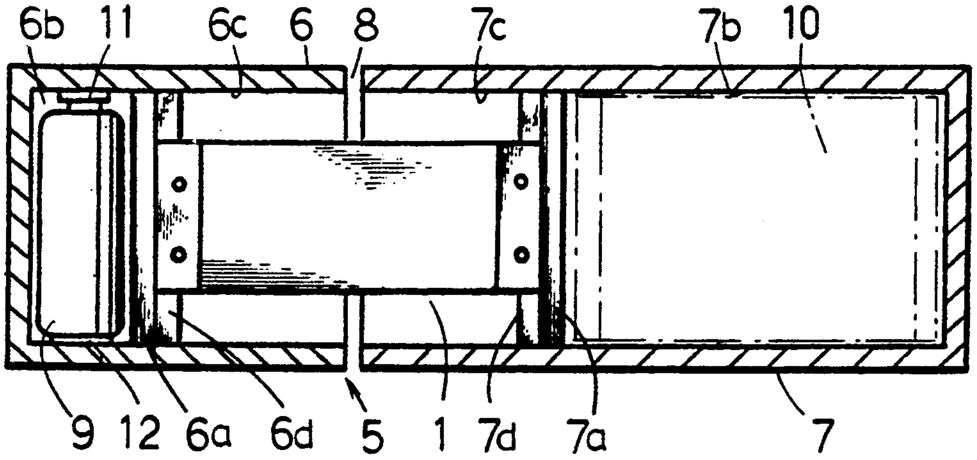
FIG. 2 is a horizontal section schematically showing one embodiment according to the present invention.
Figure 3:
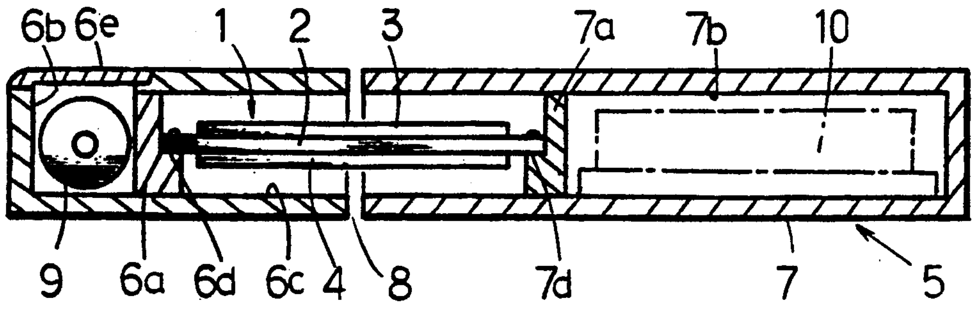
FIG. 3 is a vertical section of the arrangement of FIG. 1.
Figure 4:
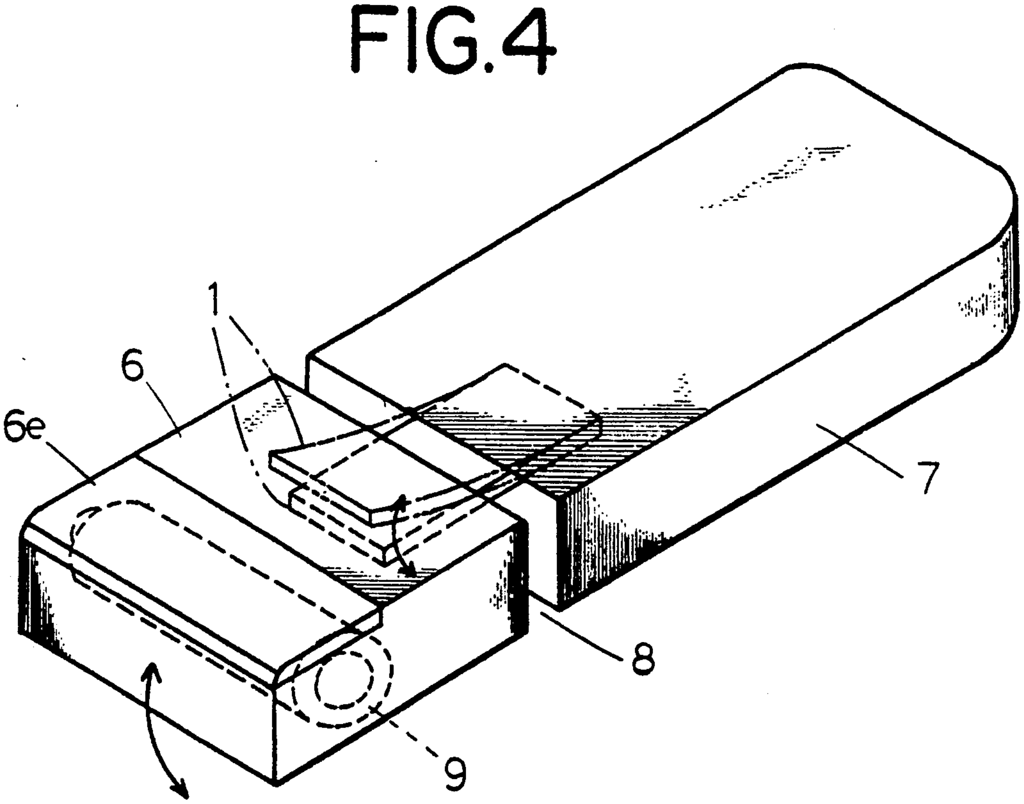
FIG. 4 is a perspective view of the arrangement of FIG. 1.

Referring now to FIGS. 2 to 4, there is shown an pager according to an embodiment of the present invention.

The illustrated pager includes a flexible piezoelectric vibrating element 1 of a piezoelectric bimorph which comprises a sheet spring member 2 and two piezoelectric elements 3 and 4 fixed on the upper and lower surfaces of the spring member 2. The pager also includes a flat shaped casing 5 which comprises two casing portions 6 and 7 of a rectangular shape separated by small spacing 8. One of the casing portions 6 has a partition **6*a* which defines a chamber 6*b* for containing a battery 9 and an opened chamber 6*c* for containing a portion of the piezoelectric vibrating element 1. The two casing portions 6 and 7 are formed to have same width and height, but the casing portion 6 has a length shorter than that of the casing portion 7**.

As will be seen in FIG. 3, the partition **6*a* is provided with a shoulder 6*d* on which one end of the piezoelectric vibrating element 1 is fastened. The chamber 6*b* is provided with a removable cover 6*e* which may be removed for replacing or recharging the battery. Similarly, the other casing portion 7 has a partion 7*a* which defines a chamber 7*b* for containing a driving control circuit unit 10 and an opened chamber 7*c* for containing a remaining portion of the piezoelectric vibrating element 1. As will be seen in FIG. 3, the partition 7*a* is provided with a shoulder 7*d* on which the other end of the piezoelectric vibrating element 1** is fastened.

Also, as shown in FIG. 3 the opened chamber **6*c* and 7*c* of each casing portion 6 and 7 has a depth approximately equal to a half of the whole length of the piezoelectric vibrating element 1. When being assembled, therefore, the piezoelectric vibrating element 1 is substantially to be covered and protected by these casing portions 6 and 7, but the small spacing 8 is left between the casing portions 6 and 7**.

Each of the piezoelectric elements 3 and 4 of the vibrating element 1 is provided with electrodes, not shown, on the upper and lower surface thereof, and the piezoelectric elements 3 and 4 are polarized in opposite directions to each other or in a forward direction. The electrodes on each piezoelectric element are connected via lead wires not shown to terminals 11 and 12 between which the battery 9 is held. Therefore, when a voltage from the battery 9 is applied to the respective electrodes of the piezoelectric elements 3 and 4, the vibrating element 1 is actuated to be vibrated.

The driving control circuit unit 10 is electrically connected to the battery terminals 11 and 12 in the battery chamber **6*b*** via flexible lead wires not shown.

When being received a predetermined calling signal the operation control circuit unit 10 is operated and the piezoelectric vibrating element 1 is energized with the voltage from the battery 9. Consequently, as shown by a chain line in FIG. 4, the piezoelectric vibrating element 1 is repeatedly bent upward and downward and thus the casing portions 3 and 4 are vibrated in upper and lower directions across the spacing 8 therebetween. In this connection, since the battery 9 and the control circuit unit 10 act as mass bodies, the vibrations of the casing portions 6 and 7 has a predetermined resonance frequency and thus is transmitted to the person who is carrying the device without generating any noisy acoustic signal troublesome for those around one.

With the pager according to this embodiment, the casing is separated into two portions one containing the battery and the other containing the operation control circuit unit, and one end of the flexible piezoelectric vibrating element is fixed to one of the casing portions and the other end of the flexible piezoelectric vibrating element is fixed to the other casing portion. The both casing portions act on the both ends of the piezoelectric vibrating element as weights which reduce the resonance frequency of the vibration thereof. It is, therefore, possible to generate a vibration with a suitable frequency without increasing the weight of the device itself. Particularly, in case the control circuit unit is contained in the larger casing portion and the battery is contained in the smaller casing portion, the resonance frequency can be more reduced, which means that the pager can be securely operated at more low frequency.

Figure 5:
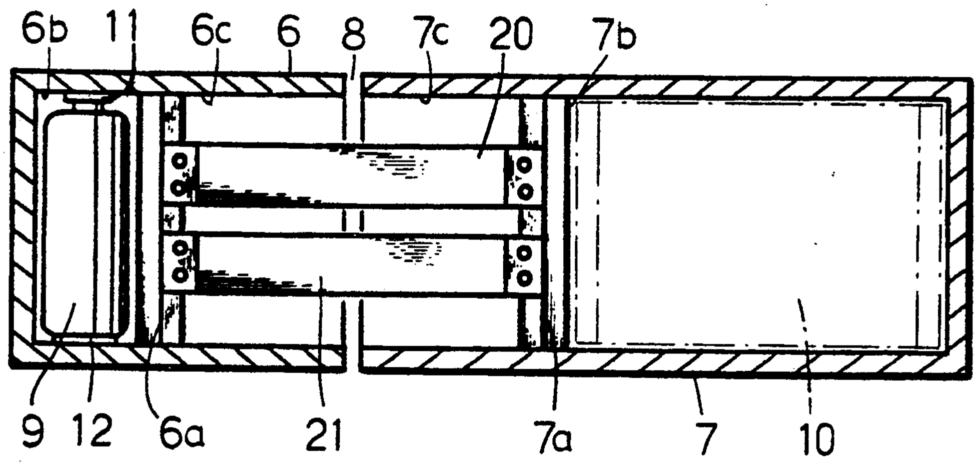
FIG. 5 is a horizontal section schematically showing another embodiment according to the present invention.
Figure 6:
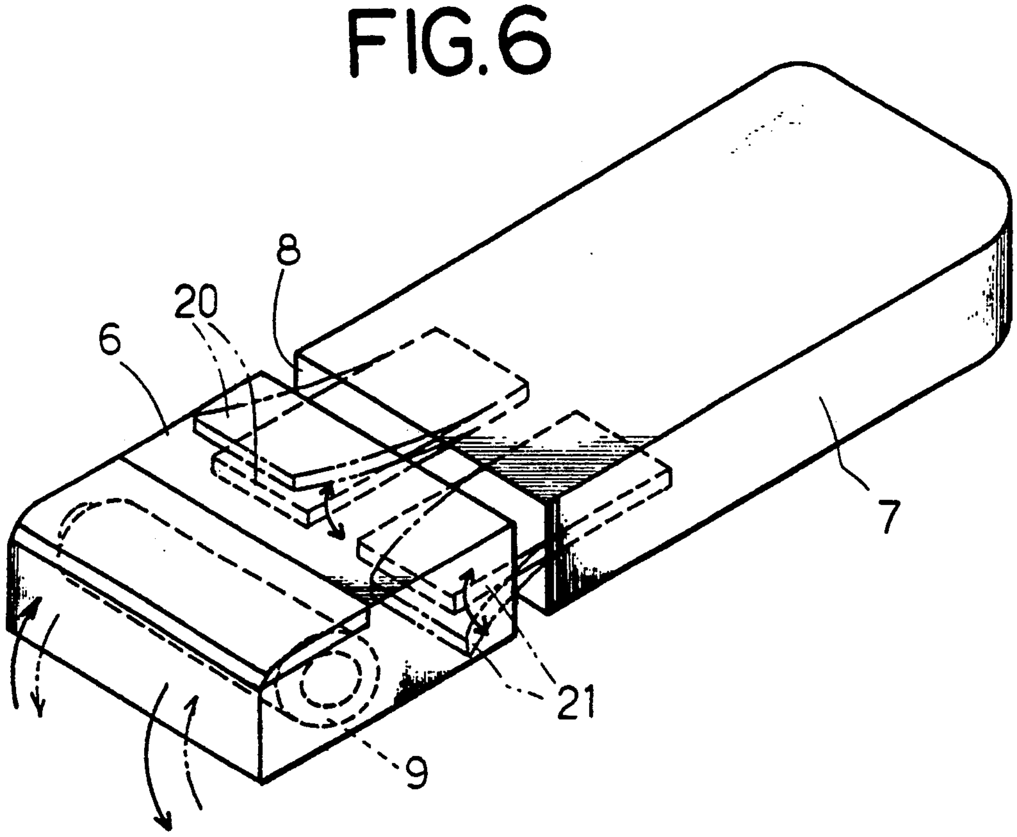
FIG. 6 is a perspective view of the arrangement of FIG. 5.

FIGS. 5 and 6 illustrate a second embodiment of the present invention in which components identical or similar to those of the above mentioned embodiment are given same reference numerals as those used in the above mentioned embodiment.

The pager illustrated in FIGS. 5 and 6 is similar to that above described with the exception that it includes two flexible piezoelectric vibrating elements 20 and 21.

Each of the piezoelectric vibrating elements 20 and 21 is constructed in similar manner to that of the first embodiment. That is, each piezoelectric vibrating element comprises a leaf spring provided with piezoelectric elements on the upper and lower surface thereof. Each piezoelectric element is provided with electrodes on the upper and lower surface thereof each of which in turn is connected to the associated battery terminal 11 or 12.

In case the piezoelectric elements on each piezoelectric vibrating element are to be connected in series to each other, they are so arranged that the upper and lower piezoelectric elements have the same polarization direction. The voltage of the battery 9 is applied to the piezoelectric vibrating elements 20 and 21 in such a manner that they have a phase difference of 90° to each other. As will be seen in FIG. 6, therefore, the both piezoelectric vibrating elements 20 and 21 are repeatedly bent in opposite direction. By this opposited bending motion of the vibrating elements 20 and 21, there is generated a twist vibration in the two casing portions 6 and 7 which informs the user that a calling is present.

According to the second embodiment mentioned above, by the provision of two flexible piezoelectric vibrating elements which are excited in opposite direction, the two casing portions are vibrated in a twist mode, which leads to more sensitive characteristic.

Figure 7:
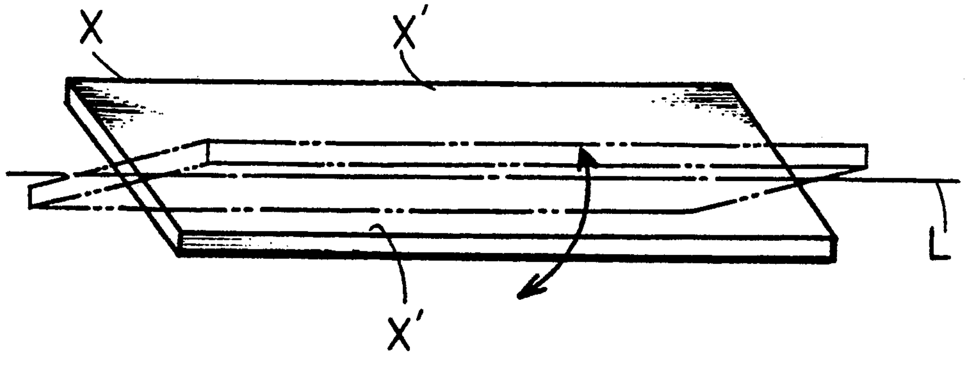
FIG. 7 is a perspective view schematically showing a principle of a further embodiment according to the present invention.

Referring to FIG. 7, the principle of a further embodiment of the present invention is illustrated. A piezoelectric vibrating body X is vibrated around the longitudinal center line L. With this vibration mode, since it is possible to reduce the distance between the center line L and each side end portion X' having a maximum vibration amplitude, a relatively low voltage is enough to obtain a desired vibration.

Figure 8:
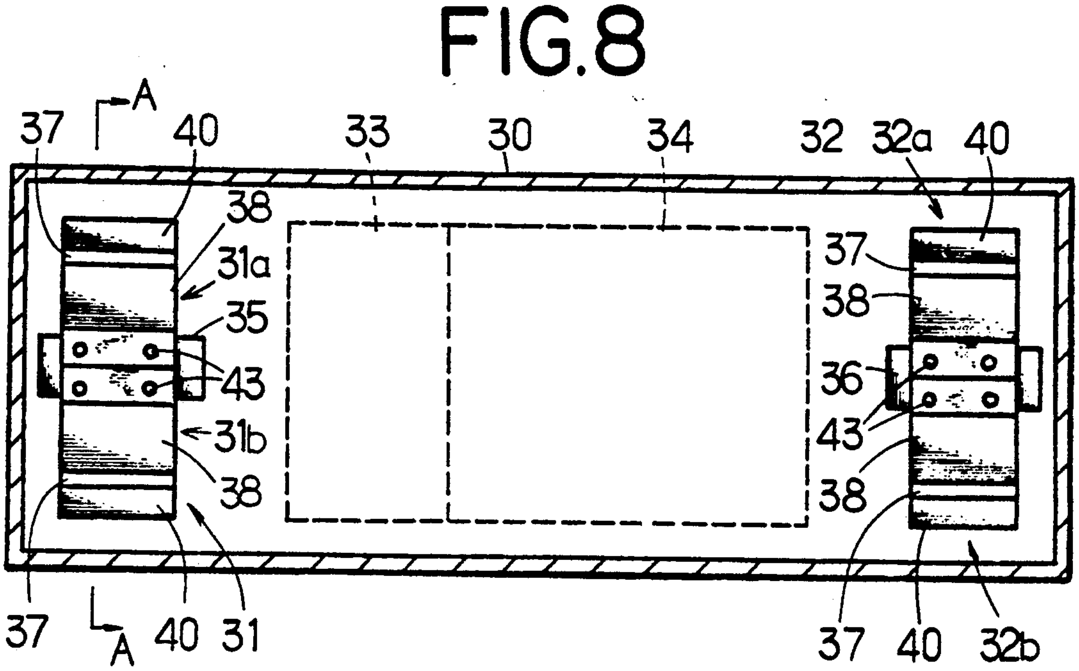
FIG. 8 is a horizontal section schematically showing an pager constructed based on the principle FIG. 7.
Figure 9:
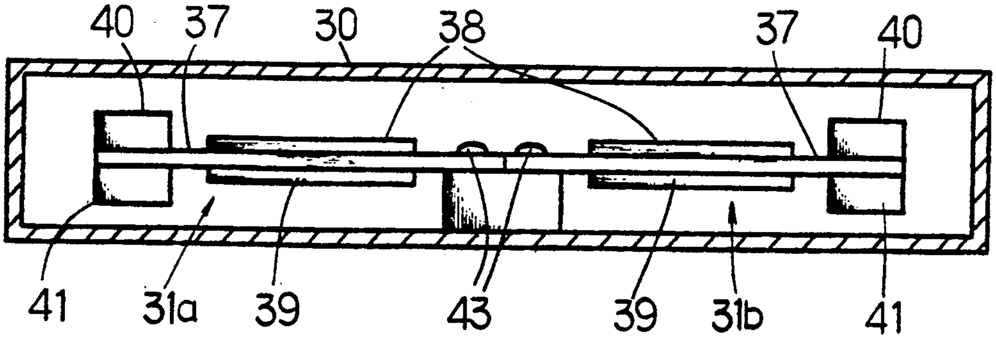
FIG. 9 is an enlarged sectional view taken along the line A—A of FIG. 8.
Figure 10:
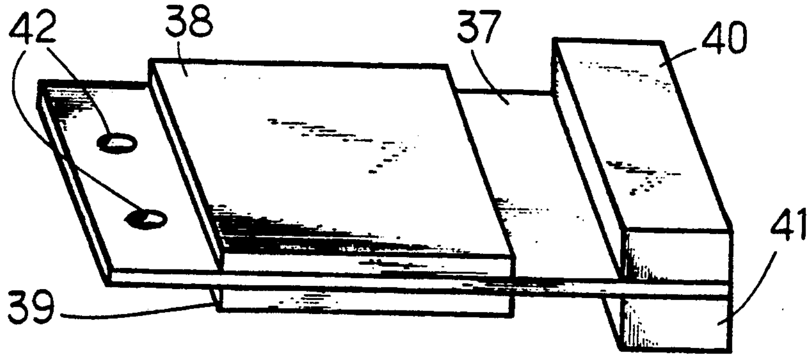
FIG. 10 is an enlarged perspective view schematically showing a piezoelectric vibrating element used in the arrangement of FIG. 8.

FIGS. 8, 9 and 10 illustrate an example of pagers using the above described principle.

In the illustrated arrangement, reference numeral 30 denotes a rectangular vibrating casing body of a flat type in which a flexible piezoelectric vibrator 31 is disposed in the portion adjacent one end and another flexible piezoelectric vibrator 32 is disposed in the portion adjacent the other end. Within the central portion of the casing body 30 there are disposed a battery 33 and an operating control circuit unit 34 for making the respective piezoelectric vibrators 31 and 32 to be actuated. The vibrating casing body 30 has a bottom wall provided with holders 35 and 36 for mounting the piezoelectric vibrators 31 and 32, respectively. These holders 35 and 36 are positioned near the both end portions on the longitudinal center line.

Each of the vibrators 31 and 32 comprises a pair of flexible piezoelectric vibrating elements 31*a* and 31*b*; 32*a* and 32*b* each of which comprises a plate spring 37 as shown in FIG. 10. The plate spring 37 has a central portion provided with two piezoelectric elements 38 and 39 on the upper and lower surfaces thereof, one end portion provided with weights 40 and 41 on the upper and lower surfaces thereof, and the other portion provided with fixing bores 42. The paired flexible piezoelectric vibrating elements 31*a* and 31*b*; 32*a* and 32*b* are laterally mounted on the associated holder by fastening members 43 so that one ends or bored ends of them are facing to each other.

Each of the piezoelectric elements 38 and 39 on each flexible piezoelectric vibrating element is provided with electrodes on the upper and lower surfaces which are polarized in opposite directions or forward direction and are connected to the control circuit unit 34 via lead wires not shown. The control circuit unit 34 is operated by receiving a predetermined signal and then makes the battery 33 to excite the respective vibrators.

In case the piezoelectric elements 38 and 39 on each flexible piezoelectric vibrating element are to be connected in series to each other, it is arranged that they have the same polarization direction. Applying of voltage from the battery 33 to the upper and lower electrodes on each piezoelectric element is controlled by control circuit unit 34 in such a manner that the paired flexible piezoelectric vibrating elements 31*a* and 31*b*; 32*a* and 32*b* have a phase difference of 90° and thus one of them is moved upwards while the other downwards.

In this way, when each piezoelectric vibrating element is moved or vibrated, an inertia force is applied to each weight on the outer end and consequently the amplitude of the vibration is increased. Then, the casing body 30 reacts on the vibration of each piezoelectric vibrating element. That is, for example when the flexible piezoelectric vibrating element 31*a* is moved upwards, then the corresponding lateral portion of the casing body 30 is moved downwards.

By the continuous opposite movement of the paired flexible piezoelectric vibrating elements 31*a* and 31*b*; 32*a* and 32*b* the casing body 30 is vibrated around the longitudinal axis thereof as a node. In this connection, since the weights of each piezoelectric vibrating element and the casing body 30 are moved in opposite direction to each other, the center of the vibration may be always maintained on the longitudinal center axis.

In this embodiment, since the casing body 30 is vibrated around the longitudinal axis thereof as a node, the piezoelectric vibrating elements can be relatively shortened and thus a higher resonance frequency and a relatively low impedance can be obtained. This means that the device according to this embodiment can be operated by a relatively low voltage and there can be obtained a vibration which is enough to inform the user the calling.

In the illustrated embodiments described above, the piezoelectric vibrating elements of bimorph type are employed. It should, however, be understood that it is possible to use piezoelectric vibrating elements of monomorph type having single piezoelectric element. Further the casing or vibrating casing body may be designed to have any suitable shape other than rectangular parallelepiped.

As illustrated and described above, according to the present invention there can be provided a piezoelectric type pager which is of simple construction and light weight with a low power requirement, and can generate a vibration which has a frequency suitable to attract a user's attention without causing any trouble for those around one carrying the pager.

It is to be understood that the present invention is not restricted to the particular embodiments illustrated and that numerous modifications and alternations may be made by those skilled in the art without departing from the spirit and scope of the invention.

I claim:

1. A piezoelectric type pager comprising at least one flexible piezoelectric vibrator, a driver circuit unit for actuating said at least one piezoelectric vibrator, an electric source for energizing said at least one piezoelectric vibrator and said driver circuit unit, a casing separated into first and second casing portions for containing said at least one piezoelectric vibrator and said electric source, said at least one piezoelectric vibrator having first and second ends, the first end of said at least one piezoelectric vibrator being affixed to said first casing portion such that said first casing portion is caused to vibrate when said at least one piezoelectric vibrator is actuated and the second end of said at least one piezoelectric vibrator being affixed to said second casing portion such that said second casing portion is caused to vibrate when said at least one piezoelectric vibrator is actuated, said first and second casing portions being assembled with a small spacing therebetween.

2. A piezoelectric type pager as claimed in claim 1, wherein the first casing portion of said casing is provided with a chamber for containing said driver circuit unit, and the second casing portion is provided with a chamber for containing said electric source.

3. A piezoelectric type pager as claimed in claim 1, wherein at least one each piezoelectric vibrator comprises a sheet spring member and piezoelectric elements fixed on upper and bottom surfaces thereof.

4. A piezoelectric type pager as claimed in claim 1, wherein two piezoelectric vibrators are juxtaposingly arranged between said first and second casing portions, a first end of each of the two piezoelectric vibrators being affixed to the first casing portion and a second end of each of the two piezoelectric vibrators being affixed to the second casing portion.

5. A piezoelectric type pager as claimed in claim 1, wherein said first and second casing portions function as weights for said at least one piezoelectric vibrator.

* * * * *